United States Patent [19]

Drysdale et al.

[11] Patent Number: 4,891,176

[45] Date of Patent: Jan. 2, 1990

[54] RESIN TRANSFER MOLDING PROCESS

[75] Inventors: James P. Drysdale, Clarkston; L. David Landrith, Lake Orion, both of Mich.

[73] Assignee: Auto-Fab, Inc., Auburn Hills, Mich.

[21] Appl. No.: 200,241

[22] Filed: May 31, 1988

[51] Int. Cl.$^4$ .............................................. B29C 45/14
[52] U.S. Cl. .................................... 264/250; 264/257; 264/259; 264/261
[58] Field of Search ...................... 264/250, 251, 46.4, 264/257, 259, 260, 261, 328.6, 279

[56] References Cited

U.S. PATENT DOCUMENTS

| | | | |
|---|---|---|---|
| 3,309,450 | 3/1967 | Rodgers | 264/257 |
| 4,131,667 | 12/1978 | Lovell | 264/102 |
| 4,240,999 | 12/1980 | Decker | 264/46.5 |
| 4,250,136 | 2/1981 | Rex | 264/257 |
| 4,379,103 | 4/1983 | Doerfling | 264/261 |
| 4,405,538 | 9/1983 | Saidin | 264/54 |
| 4,405,543 | 9/1983 | Murphy | 264/DIG. 6 |
| 4,420,447 | 12/1983 | Nakashima | 264/46.4 |
| 4,548,861 | 10/1985 | Barnes | 264/257 |
| 4,556,529 | 12/1985 | Muser | 264/251 |
| 4,560,523 | 12/1985 | Plumley | 264/250 |
| 4,676,041 | 6/1987 | Ford | 264/257 |
| 4,714,575 | 12/1987 | Preston | 264/46.4 |
| 4,734,147 | 3/1988 | Moore | 264/248 |
| 4,734,230 | 3/1988 | Rhodes | 264/250 |

Primary Examiner—Jay H. Woo
Assistant Examiner—Jeremiah F. Durkin, II
Attorney, Agent, or Firm—Gifford, Groh, Sheridan, Sprinkle and Dolgorukov

[57] ABSTRACT

A method for manufacturing a panel, such as an automotive panel, using the resin transfer molding (RTM) process. The method includes the steps of preforming a first mat of glass fibers into a shape approximating one side of the panel and, similarly, preforming a second mat of glass fibers into a shape approximating a second side of the panel. A urethane core is sandwiched in between the preformed mats to thereby form a premolded assembly. This premolded assembly is placed into a mold and a settable resin is injected into the mold to form the panel.

9 Claims, 2 Drawing Sheets

U.S. Patent   Jan. 2, 1990   Sheet 1 of 2   4,891,176
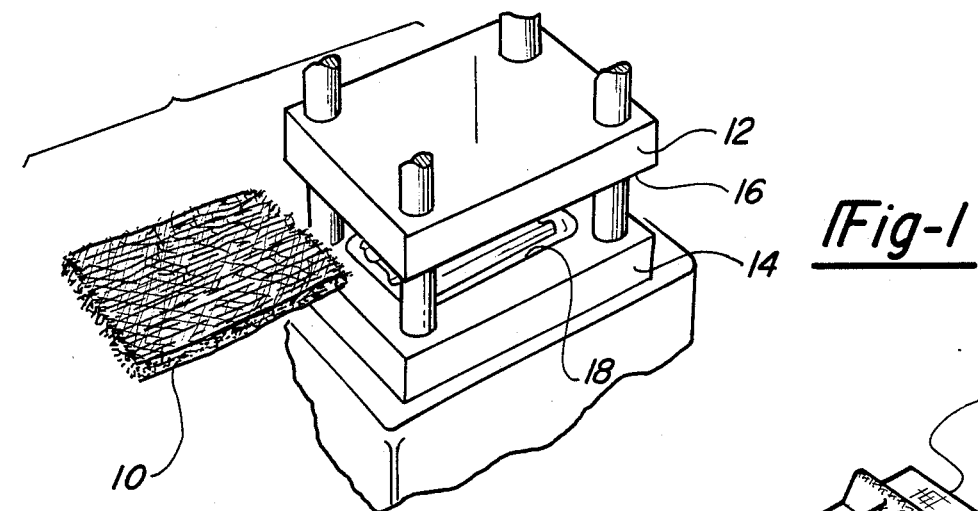
*Fig-1*
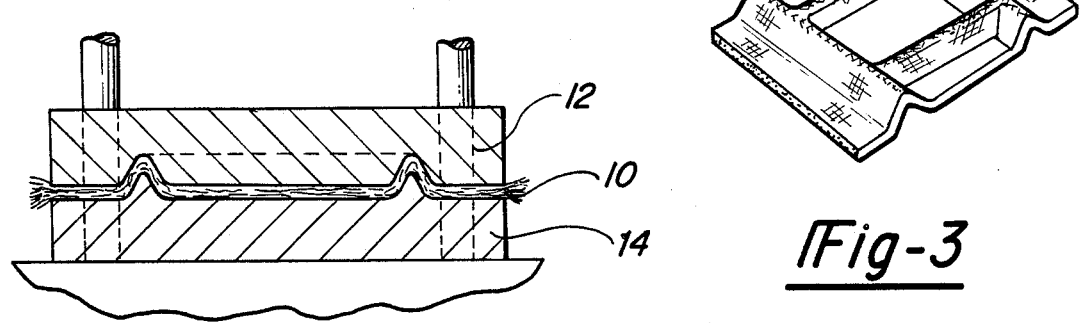
*Fig-2*   *Fig-3*
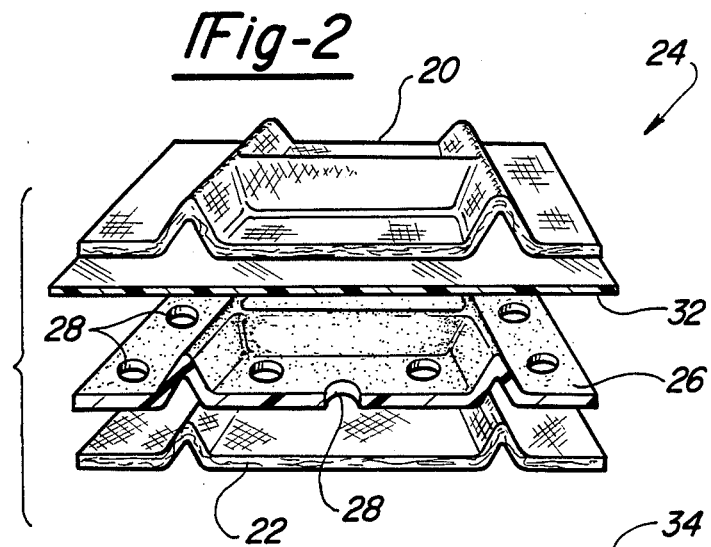
*Fig-4*
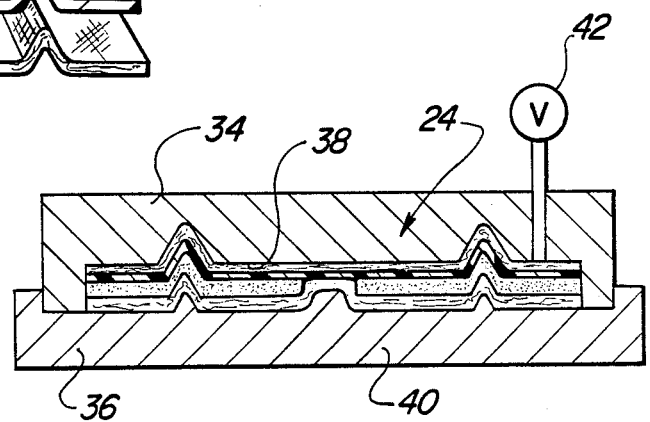
*Fig-5*

RESIN TRANSFER MOLDING PROCESS

BACKGROUND OF THE INVENTION

I. Field of the Invention

The present invention relates to a method for forming a panel, such as an automotive panel, by the resin transfer molding process.

II. Description of the Prior Art

Automotive panels, such as the quarter panels, rear deck, hood and the like, are typically manufactured from metal stampings which are subsequently welded together in order to form the desired panel. This process for forming automotive panels is relatively inexpensive when a large number of panels are made from a single stamping since the cost of the stamping is amortized over the number of stampings made.

However, there are a number of automotive vehicles manufactured today which are manufactured in relatively limited quantities, for example 20,000 or 30,000 vehicles. For such vehicles, the amortization cost of the metal stampings necessary to form the various automotive panels significantly increases the overall cost of the vehicle. In some cases, the manufacture of the limited quantity vehicle is almost prohibitive due to the high cost of the tooling necessary to make the stampings for the various automotive panels.

One relatively new process to reduce the cost of manufacturing the automotive panels for limited quantity vehicles has been developed for constructing the vehicle panels out of glass fibers, rather than metal. The material cost for such panels is higher than the cost for a metal panel, but the tooling costs are substantially lower.

In these previously known fiber panels, a matting of glass fibers is simply positioned within the mold and the mold is then injected with a settable resin which, when hardened, forms the panel. These previously known methods for forming the automotive panels, however, have not proven wholly satisfactory in operation.

One disadvantage of the previously known methods for forming the automotive panels is that the panel has a relatively rough outer texture when formed. In many cases, the cosmetic defects on the panel require that the panel be scrapped.

In addition, many of these previously known panels are relatively heavy in construction and thus unnecessarily increase the overall weight of the vehicle. Attempts to construct a vehicle panel from two sheets of glass fibers with a lightweight core positioned therebetween have not proven wholly successful since shrinkage lines appear on the panel where the two sheets of glass fibers contact each other. Such lines are caused by uneven shrinkage between the two sheets of glass fibers.

SUMMARY OF THE PRESENT INVENTION

The present invention provides a method for manufacturing a panel of glass fibers. The present invention comprises the first step of preforming a first mat of glass fibers into a shape approximating one side of the panel. Similarly, a second mat of glass fibers is preformed into a shape approximating a second side of the panel. Although a plurality of different methods can be used for preforming the panels, preferably the mat includes a thermoplastic bonding agent which, when set, holds the mat in its preformed shape.

A urethane core is sandwiched in between the two preformed mats to thereby form a premolded assembly. This premolded assembly is placed into a mold and the mold is then injected with a settable resin. Once the resin sets, the panel is formed.

In order to prevent the appearance of shrink lines from the molding process on the panel, preferably a flexible sheet, such as a polyethylene sheet, is disposed in between one mat and the core prior to the molding step. This sheet has proven effective in eliminating shrinkage lines from appearing on the outside of the formed panel.

BRIEF DESCRIPTION OF THE DRAWING

A better understanding of the present invention will be had upon reference to the following detailed description, when read in conjunction with the accompanying drawing, wherein like reference characters refer to like parts throughout the several views, and in which:

FIGS. 1-3 are diagrammatic views illustrating the steps of preforming the fiberglass mats;

FIG. 4 is a step illustrating the forming of the premolded assembly;

FIGS. 5 and 6 are diagrammatic views illustrating the molding process for the panel;

DETAILED DESCRIPTION OF A PREFERRED EMBODIMENT OF THE PRESENT INVENTION

Figure 6:
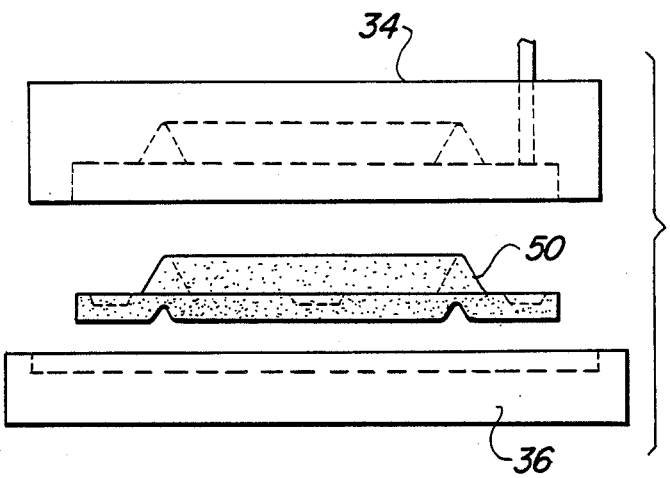

With reference first to FIGS. 1-3, the method of manufacturing a panel 50, preferably an automotive panel, of the present invention comprises the initial step of preforming a mat 10 of glass fibers which is impregnated with a bonding agent. This bonding agent can, for example, be a thermoplastic or a thermosetting bonding agent.

Referring to FIGS. 1 and 2, the fiberglass mat 10 is positioned in between two heated shaping tools 12 and 14 having facing surfaces 16 and 18, respectively, which approximate the shape of the desired end panel. As best shown in FIG. 2, with the mat 10 positioned in between the shaping tools 12 and 14, the shaping tools 12 and 14 compress against the mat 10 and are heated.

The heat from the shaping tools 12 and 14 sets the bonding agent in the mat 10 and preforms the mat 10 into a shape approximating one side of the desired final panel 50. The preformed mat 20 is illustrated in FIG. 3.

The above process is then repeated, using different shaping tools 12 and 18, to form a second preformed mat 22 of glass fibers having a shape approximating a second side of the desired final panel 50. The shape of the surfaces 16 and 18 of the shaping tools 12 and 14 will, of course, have a different surface form which corresponds to the second side of the final panel 50.

Referring now particularly to FIG. 4, a premolded assembly 24 is constructed by sandwiching a urethane foam core 26 in between the preformed mats 20 and 22. Additionally, this foam core 26 may include a plurality of openings 28 so that the inside surfaces of the preformed mats 20 and 22 at the openings 28 are closely adjacent each other. However, a flexible polyethylene sheet 32 is preferably positioned between one preformed mat 20 and the core 26 to prevent the mats 20 and 22 from contacting each other except around their outer edges. The purpose for this polyethylene sheet 32 will be subsequently described.

With reference now to FIG. 5, the preformed assembly 24 is then positioned between two mold halves 34 and 36 having surfaces 38 and 40 which conform to the shape of the desired end panel. A settable resin 42 is then injected into the mold chamber formed by the mold halves 34 and 36 which impregnates the preformed mats 20 and 22 and, once set, hardens to form the panel 50. The resin is preferably a liquid catalyzed polyester resin.

Figure 7:
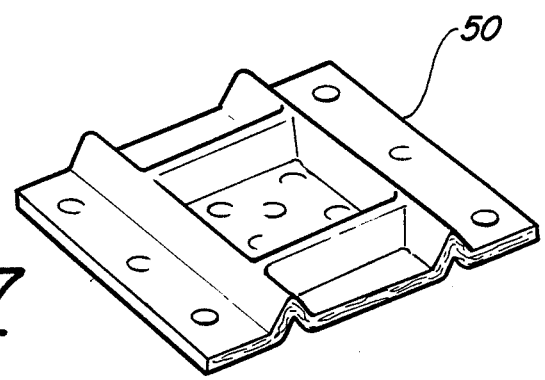
FIG. 7 is a diagrammatic view illustrating the final automotive panel.
Figure 8:
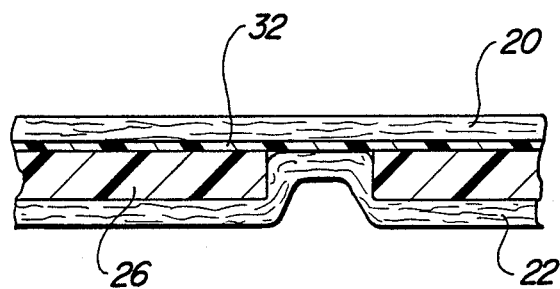
FIG. 8 is a sectional view of the final automotive panel.

Referring now to FIGS. 6 and 7, once the resin is set, the mold halves 34 and 36 are opened (FIG. 6) and the finished panel 50 is removed (FIG. 7). A crossection of this panel 50 is illustrated in FIG. 8 showing the foam core 26 sandwiched in between the preformed mats 20 and 22 (now impregnated and hardened with the resin). The polyethylene sheet 32 also prevents the mats 20 and 22 from contacting each other, except around the outer periphery of the panel 50. In practice, it has been found that this polyethylene sheet 52 prevents the formation of shrink lines on the outer surface of the finished panel 50.

From the foregoing, it can be seen that the present invention provides a simple and yet wholly effective means for constructing panels 50, such as automotive panels, using resin transfer molding (RTM) process. A primary advantage of utilizing the present invention is that the molds 34 and 36 can be relatively inexpensively constructed, when contrasted with the cost for the tooling for a like metal panel. This enables the automotive panels 50 to be economically constructed for even low production vehicles.

Having described my invention, however, many modifications thereto will become apparent to those skilled in the art to which it pertains without deviation from the spirit of the invention as defined by the scope of the appended claims:

I claim:

1. A method for manufacturing a panel comprising the steps of:
    preforming a first mat of glass fibers into a shape approximating one side of the panel,
    preforming a second mat of glass fibers into a shape approximating a second side of the panel,
    sandwiching a core in between said preformed mats to thereby form a premolded assembly,
    placing said premolded assembly in a mold,
    injecting a settable resin into said mold, and
    placing a flexible sheet between the core and one of said mats prior to forming the premolded assembly wherein said sheet minimizes shrinkage lines on said panel.

2. The method as defined in claim 1 wherein said resin is a polyester resin.

3. The method as defined in claim 1 wherein said resin is a liquid catalyzed polyester resin.

4. The method as defined in claim 1 wherein said core is constructed from urethane.

5. The method as defined in claim 1 wherein said sheet is a polyethylene sheet.

6. The method as defined in claim 1 wherein each fiberglass mat includes a bonding agent which, when set, holds the mat in its preformed shape.

7. The method as defined in claim 6 wherein said bonding agent is a thermoplastic bonding agent.

8. The method as defined in claim 6 wherein said bonding agent is a thermosetting bonding agent.

9. The method as defined in claim 6 wherein said preforming steps each comprises the following steps:
    placing said mat between two heated shaping tools,
    compressing said tools together with said mat sandwiched in between the shaping tools.

* * * * *